April 16, 1940.  J. LEDWINKA  2,197,727
VEHICLE
Filed April 8, 1937   4 Sheets-Sheet 1
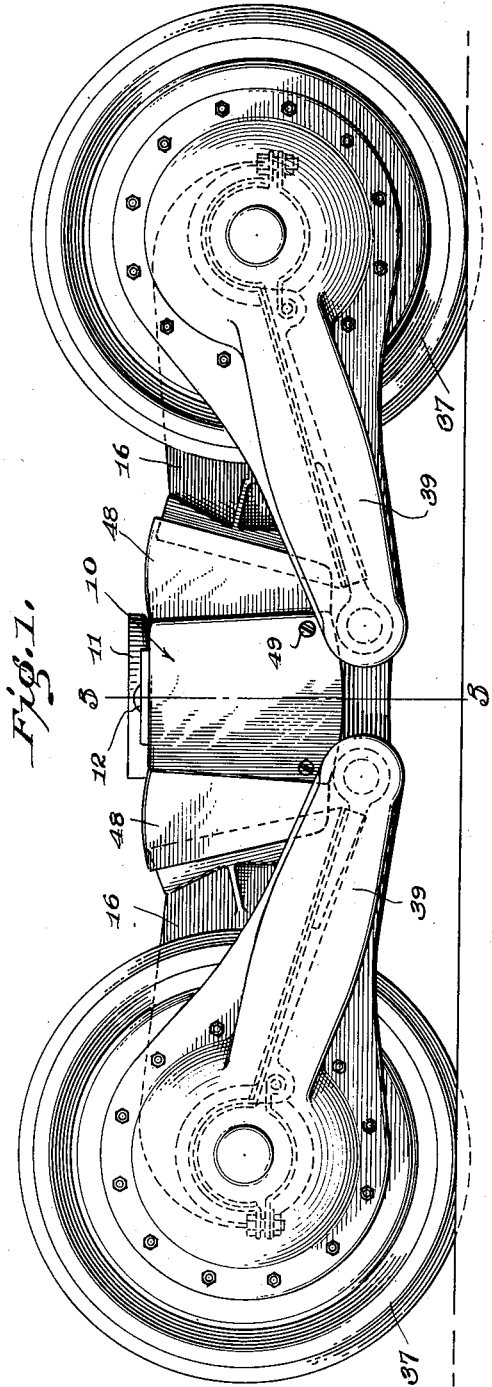
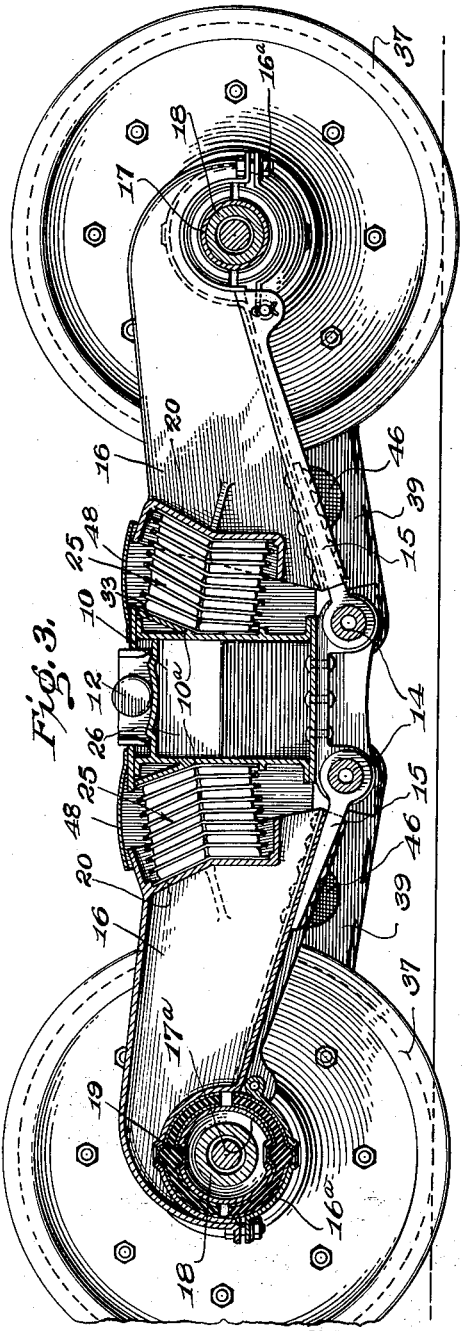
INVENTOR.
Joseph Ledwinka
BY
ATTORNEY.

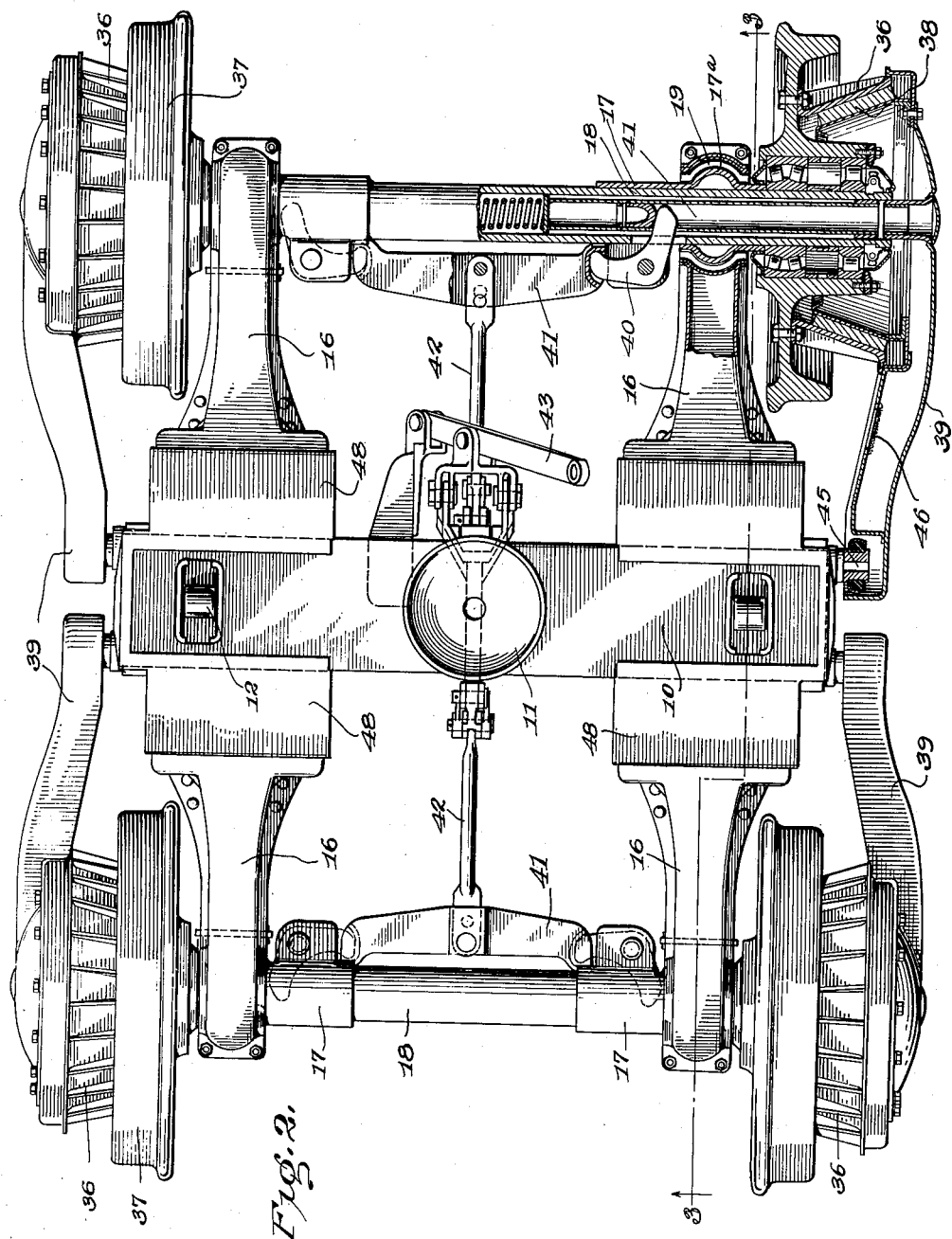

April 16, 1940.  J. LEDWINKA  2,197,727
VEHICLE
Filed April 8, 1937  4 Sheets-Sheet 3
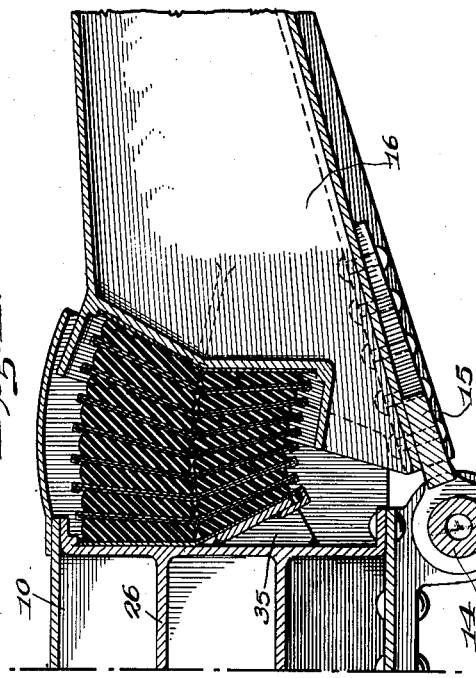
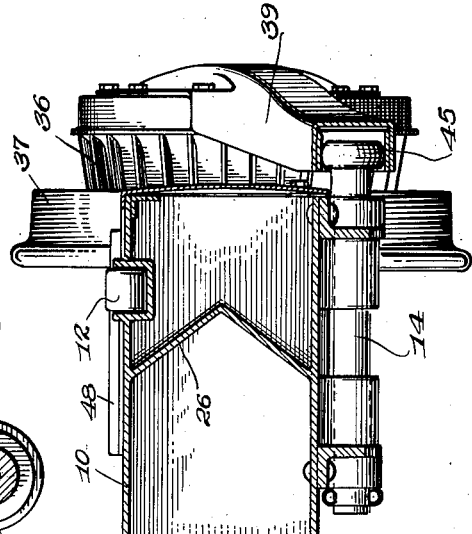
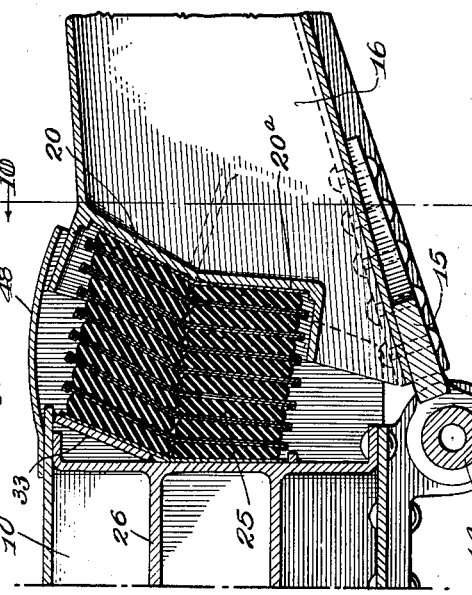
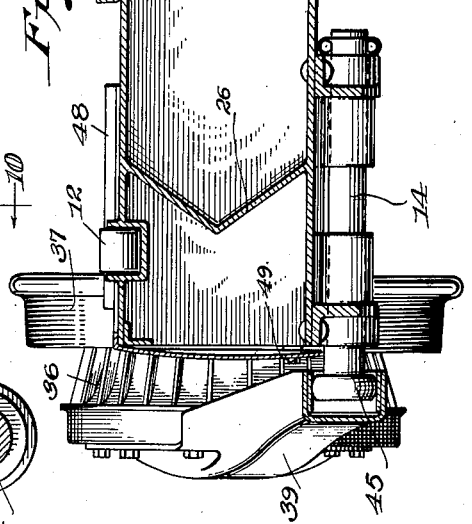
INVENTOR.
Joseph Ledwinka
BY
ATTORNEY.

April 16, 1940.   J. LEDWINKA   2,197,727
VEHICLE
Filed April 8, 1937   4 Sheets-Sheet 4
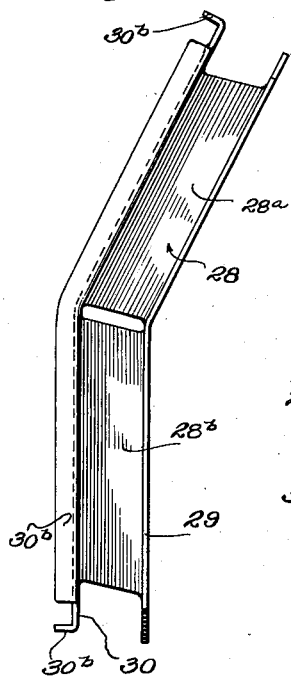
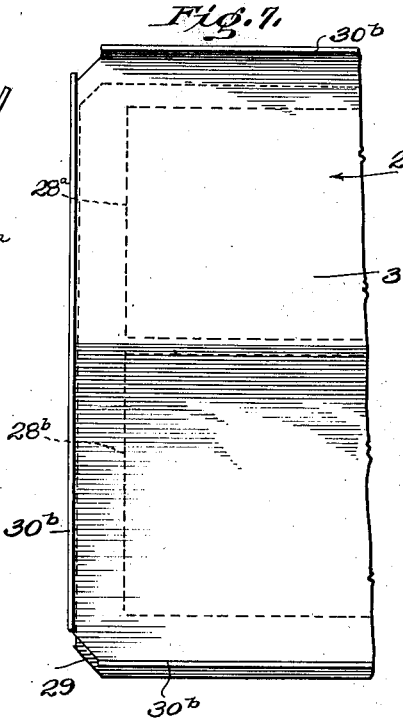
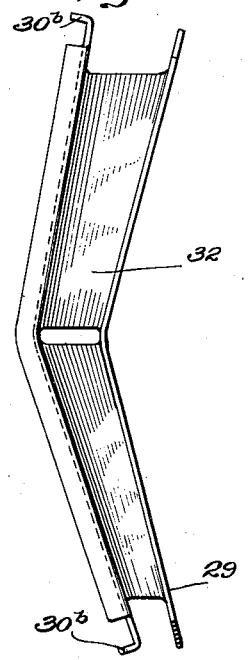
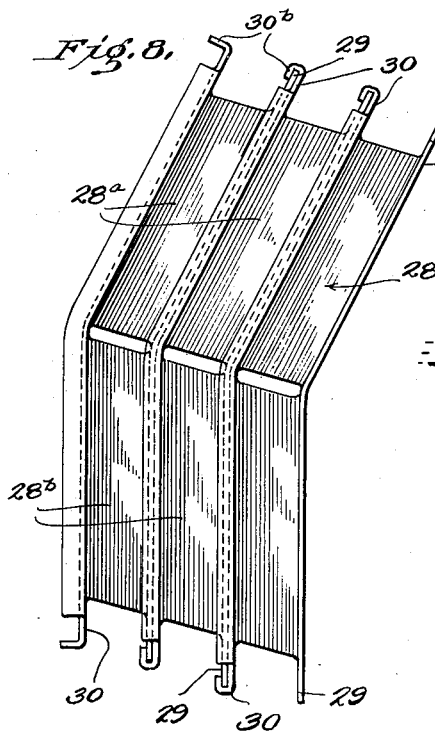
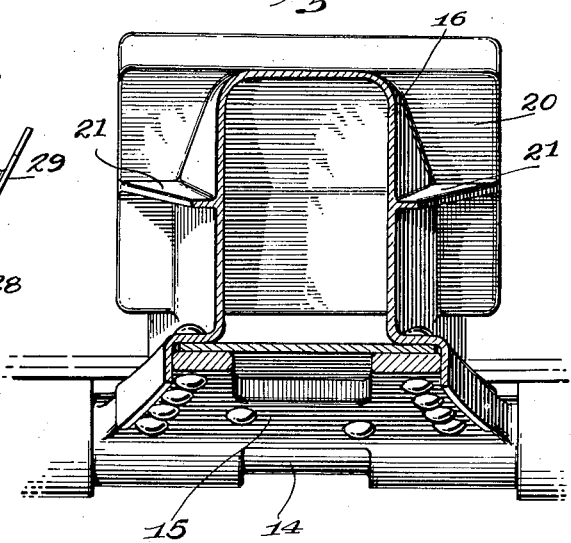
INVENTOR.
Joseph Ledwinka
BY
ATTORNEY.

Patented Apr. 16, 1940

2,197,727

UNITED STATES PATENT OFFICE 2,197,727

VEHICLE

Joseph Ledwinka, Philadelphia, Pa., assignor to Edward G. Budd Manufacturing Company, Philadelphia, Pa., a corporation of Pennsylvania Application April 8, 1937, Serial No. 135,634

7 Claims. (Cl. 105—182)

This invention relates to improvements in rail car trucks and more particularly to an improved suspension therefor.

One of the particular features of the invention is to provide an articulated framework for a rail car truck of the bogie type by which a lighter weight and easier riding truck may be obtained.

Another feature of this invention is to provide an improved spring suspension for an articulated type of rail car truck in which articulated members extending to the axles are pivoted on the intermediate bolster and are supported therefrom by rubber panels abutting the bolster and extension faces on the articulated members.

A more specific feature of the present invention is to provide a self-centering rubber panel suspension system for resisting the vertical reactions of loads carried on a bolster which is hinged to the truck frame members.

Another object of the invention is to provide an improved non-metallic suspension system consisting of a plurality of rubber panels individually attached to separate plates, such panels being of an angular shape and suitably anchored within the truck framework.

A further object of the invention is to provide a spring suspension of the hinge type with an intermediate panel of rubber in which the outer portion has the greatest compression load to resist bulging and the inner portion takes substantially its full share of the load so that all of the rubber is worked.

Further objects and advantages of the following invention will appear more particularly from the description herein when taken in connection with the attached drawings illustrative of a preferred form of embodiment of the invention and, in which, Fig. 1 is a side elevation of an articulated frame truck;

Fig. 2 is a plan view of the truck with parts of the framework broken away to show the internal construction;

Fig. 3 is a vertical section taken substantially along the irregular line 3—3 of Fig. 2;

Fig. 4 is an enlarged vertical sectional view similar to a part of Fig. 3 and showing the preferred arrangement of the spring assembly;

Fig. 5 is a transverse vertical section taken substantially along the center line of the bolster and on the line 5—5 of Fig. 1;

Fig. 6 is an end elevation of a typical form of uniform width rubber panel;

Fig. 7 is a side elevation of the panel shown in Fig. 6;

Fig. 8 is an end elevation of a series of the rubber panels shown in Fig. 6 showing the method of attachment;

Fig. 9 is an end elevation of a particular panel of tapering width;

Fig. 10 is a transverse vertical section taken substantially along the line 10—10 of Fig. 4, and Fig. 11 is a vertical section similar to Fig. 4 showing a modified form of rubber spring construction.

The achievement of light weight construction for rail car trucks has been greatly hampered by the continued use of a substantially double framework, one part of which has served as the axle alignment control and the other of which has served to receive the body loads and carry the brake rigging and with each framework of great rigidity so that it might be independently built and sustain the loads of the usual spring suspension. Furthermore, the use of leaf and coil and compound springs has not given the most comfortable support, nor a quiet, readily repaired and simple truck construction.

In the present concept, it has been found possible to use but a single framework with an independent spring suspension for the respective wheels so that there is an articulated reaction by which uniformity of wheel contact is assured. In addition, rubber has been used for the resilient load reactions with the rubber loaded in such a manner that adequate deflection may be obtained with good damping qualtities and the truck is both simplified in construction and quieted in operation.

In general, the truck in accordance with one form of embodiment of my invention is provided with a transverse beam or transom generally indicated at 10 which has the center plate 11 and side bearings 12 to receive the car body. This transverse beam is provided with a plurality of trunnions 14 on which the side frame members 16 are hinged through leaf members 15. As clearly shown in Figs. 2 and 3, these side frame members extend outward to and are conveniently mounted on a sleeve 17 carried by non-rotatable axle housings 18. Rubber blocks 19 are clamped between the axle housings 18 and the side frame members 16 by the caps 16a and with the enlarged portion engaging the enlarged section 17a of sleeve 17, lateral movement of the frame members is limited to self-centering of the bearings and the necessary flexibility for movement of the frame members.

The side frame members 16 are provided with upstanding abutments 20 reinforced by webs 20a shown in Fig. 10, which abutments cooperate with the upstanding faces 10a of the bolster and between these rubber faces 10a and 20 is placed a spring nest generally represented by the character 25. A set of four of these spring nests 25 are carried on the truck, one on each side of the bolster adjacent each articulated frame member 16 so that each frame member becomes an individual part of the spring suspension. It will be seen that vertical loads on the transverse beam 10 tend to cause its movement downward with the load reaction resisted by the spring nests 25 and the transverse beam 10 is adequately reinforced by internal flange members 26 shown in Fig. 5, which extend transversely of the beam 10 or longitudinally of the truck and adequately resist internal strains set up by the respective spring nests.

The spring nests 25 are preferably comprised of a plurality of resilient panels generally indicated at 28 in Fig. 6, each of which may have a plurality of blocks 28a and 28b of a suitable rubber compound carried between a plurality of plates 29 and 30, one of which is relatively flat and the other of which may be provided with overlapping flanges 30b as shown in Fig. 8 which are adapted to overlap the edges of the adjacent rubber panel for attachment thereto. It will of course be understood that the adjacent panels may be otherwise attached to each other.

The plates 29 and 30 are suitably formed with their opposite end portions at a slight angle to each other, and the abutment faces 10a and 20 have their opposite ends arranged at similar angles, so that the spring nest panels are self-centering and the spring nest as a whole is held by suitable shoulders rather than by pins or other added parts. Wear on the parts is thus eliminated and the spring nest is always in the desired position.

The reaction of vertical loads on the transverse member 10, on the spring nests 25 is primarily that of compression. I have found, however, that with a conical wedge of rubber, there are serious objections which can be overcome by the arrangement of the material substantially as shown in Fig. 4. It is especially desirable to compress the rubber at the greatest radius the most, which prevents any tendency of the rubber to bulge outward. This may be conveniently accomplished by providing the offset ledge 33 which extends outwardly from the transverse beam 10.

In addition, I find it especially desirable to offset outwardly, the lower face 20a of abutment 20 in order to obtain enough rubber for effective flexibility. At the shorter radius, so little would ordinarily be available as to prevent carrying ordinary train car loads. The ratio between the amount of rubber at the top and at the bottom may vary in accordance with the respective radii, but I find it especially desirable to provide approximately 20% more at the top than at the bottom when the ratio of radii is 2 to 1.

If the limitations on the offset of the abutments 20a and 33 are such that other than uniform thick blocks of rubber can be used, the wedge shape type shown in Fig. 9 may be used entirely or in combination with the uniform thick sections shown in Fig. 6. In Fig. 4, the spring nest 25 is provided with a combination of uniform thick and variable thickness panels.

A slightly modified form of construction is shown in Fig. 11 in which a wedge 35 is carried at the bottom of the transverse beam 10 and all of the panels are of wedge shape so that substantially the same reaction is obtained. It will be understood that many variations in thickness of rubber and angularity of abutments can be used depending on the flexibility and loads.

The details of the brake rigging are not claimed in this application, although it will be noted that the brakes include a brake drum 36 carried by the wheels 37. The brake shoes 38 are carried by the torque arm 39, the center of which has a hollow post 41 which is extended into the hollow axle 18 and maintains concentricity. Operation of the brake is by means of this hollow post which is actuated internally by bellcrank 40 which is in turn operated by equalizer 41 through linkage 42 from the brake lever 43. The torque arm is kept from rotation by its engagement with the trunnion 45 having a resilient bushing and carried on the transverse beam 10. The torque arm is preferably hollow, having an opening 46 for the flow of air into the interior of the brake surfaces to cool them.

The transverse member 10 also carries the cover members 48 which cover the spring nests 25 and this may conveniently be of U-shape, extending across the ends of the transverse member and being secured thereto by securing screws 49.

While I have shown a preferred form of embodiment of my invention, I am aware that modifications may be made thereto and I therefore desire a broad interpretation of the invention within the scope and spirit of the disclosure herein and the claims appended hereinafter.

What I claim is:

1. A truck comprising spaced axles, independently connected side frame members flexibly secured to said axles adjacent the ends thereof, a transverse beam, means to hinge said frame members to said transverse beam, and a non-metallic compression spring means to resist the rotation of said frame members with respect to said hinged connection, said spring means having a disproportionate amount of material at a top portion relatively to a bottom portion and being housed between the beam and frame members in such wise as to be under greater compression at its section of greater radius.

2. An articulated frame vehicle having a body carrying abutments and a frame articulated thereto, said frame including a plurality of members having upstanding abutments opposed to the body abutments and between which the body is carried, and means to resist the tendency of said frame members to rotate about their articulation including rubber panels between the abutments on said members and the abutments on the body with reactions transmitted substantially directly from an abutment on a frame member to the adjacent abutment on the body, said rubber panels having a greater amount of rubber in their inner portion adjacent the point of articulation than the proportional amount based on the radial distance of said portion from the point of articulation, the panels being under greater compression at their sections of greater radii.

3. In a rail car truck of the class described comprising a transverse beam member, a plurality of axles, a plurality of frame members flexibly secured to said axles and articulated with respect to said transverse beam member and means to resist relative rotation of said articulated frame members with respect to the transverse beam member, said means including a plurality of rubber panels on opposite sides of the transverse beam member, each of said rubber panels having a disproportionate amount of rubber at a top portion relatively to a bottom portion and being under greater compression at its section of greater radius.

4. A truck having a transverse beam member carrying abutments, longitudinally extending frame members hinged thereto, and wheeled axles supporting said frame members, said frame members having abutment portions extending therefrom and compression resisting means comprising laminated rubber springs between the respective abutment portions to resist the load reactions on said transverse member, each of said rubber springs being of unequal width at top and bottom portions thereof and under maximum compression at points of their greater radii.

5. A truck having a transverse beam member carrying abutments, longitudinally extending frame members hinged thereto, and wheeled axles supporting said frame members, said frame members having abutment portions extending therefrom and resilient means between the respective abutment portions and parts of the transverse beam member to resist the load reactions on said transverse member, said resilient means including a plurality of rubber panels in compression, said rubber panels including a plurality of blocks of rubber at an angle to each other and the abutments against which they bear being correspondingly angled, whereby each of said rubber panels is substantially self-centering.

6. A truck having a transverse beam member, longitudinally extending frame members hinged thereto, and wheeled axles supporting said frame members, said frame members having abutment portions extending therefrom and resilient means between the respective abutment portions and parts of the transverse beam member to resist the load reactions on said transverse member, said transverse beam member having a projecting surface cooperating with the resilient means, the resilient means being of unequal dimensions at different ends and so arranged that the maximum compression on the resilient means is obtained at the greater radius from the hinged connection to prevent bulging because of internal forces.

7. A truck having a transverse beam member, longitudinally extending frame members hinged thereto, and wheeled axles supporting said frame members, said frame members having abutment portions extending therefrom and resilient means between the respective abutment portions and parts of the transverse beam member to resist the load reactions on said transverse member, said frame members having offset abutment portions adjacent the hinged connection and the resilient means including a greater than proportional amount of rubber based on the varying radii at one end relatively to another end, said resilient means being so arranged as to be under greater compression at sections of their greater radii.

JOSEPH LEDWINKA.